US010997437B2

(12) United States Patent
Kwon

(10) Patent No.: US 10,997,437 B2
(45) Date of Patent: May 4, 2021

(54) APPARATUS FOR MANAGING DRIVING PATTERN BASED ON OBJECT RECOGNITION, VEHICLE DRIVING CONTROLLING APPARATUS USING THE SAME AND METHOD THEREOF

(71) Applicants: HYUNDAI MOTOR COMPANY, Seoul (KR); KIA MOTORS CORPORATION, Seoul (KR)

(72) Inventor: Ji Won Kwon, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 176 days.

(21) Appl. No.: 16/379,379

(22) Filed: Apr. 9, 2019

(65) Prior Publication Data
US 2020/0184235 A1  Jun. 11, 2020

(30) Foreign Application Priority Data

Dec. 7, 2018  (KR) .......................... 10-2018-0156550

(51) Int. Cl.
*G06K 9/62* (2006.01)
*G06K 9/00* (2006.01)

(52) U.S. Cl.
CPC ....... *G06K 9/00805* (2013.01); *G06K 9/6201* (2013.01)

(58) Field of Classification Search
CPC .......... G06K 9/00805; G06K 9/6201–9/6215; G06T 2207/30261; G08G 1/167; G05D 2201/02–2201/0218; G05D 2201/0212; G05D 2201/0213; B60W 30/08–30/0956
See application file for complete search history.

(56) References Cited

U.S. PATENT DOCUMENTS 9,296,383 B2 * 3/2016 Flehmig ................... G08G 1/16

* cited by examiner

*Primary Examiner* — Brian Werner
(74) *Attorney, Agent, or Firm* — Brinks Gilson & Lione

(57) ABSTRACT

An object recognition-based driving pattern managing server, a driving control apparatus of a vehicle using the same, and a method are provided. A server includes a processor recognizing a target object extracted from image information and determining a priority for each vehicle behavior scenario based on an accident rate for each vehicle behavior scenario among patterns similar to a mother pattern of the recognized target object to transmit the priority for each vehicle behavior scenario to a vehicle and a storage storing at least one or more of information about an image similar to the target object, target object information, pattern information for each target object, vehicle behavior scenario information, and priority information for each vehicle behavior scenario based on the target object.

16 Claims, 14 Drawing Sheets

EXAMPLE OF TARGET OBJECT ATTRIBUTE

| ID | TARGET OBJECT |
|---|---|
| ID-001 | PASSENGER VEHICLE |
| ID-002 | TRUCK |
| ID-003 | PEDESTRIAN |
| ID-004 | BICYCLE |
| ID-005 | MOTORCYCLE |
| ID-007 | BRANCH |
| ID-008 | ANIMAL CARCASS |
| ID-009 | STYROFOAM |
| ID-010 | STYROFOAM |
| ID-011 | VEHICLE DEBRIS |
| ID-012 | BOX |
| ID-013 | WATER DEER |
| – | – |
| ... | ... |
| ID-999 | UNRECOGNIZABLE |

<301>

UPDATE →

| ID | TARGET OBJECT |
|---|---|
| ID-001 | PASSENGER VEHICLE |
| ID-002 | TRUCK |
| ID-003 | PEDESTRIAN |
| ID-004 | BICYCLE |
| ID-005 | MOTORCYCLE |
| ID-007 | BRANCH |
| ID-008 | ANIMAL CARCASS |
| ID-009 | STYROFOAM |
| ID-010 | STYROFOAM |
| ID-011 | VEHICLE DEBRIS |
| ID-012 | BOX |
| ID-013 | WATER DEER |
| ID-014 | VINYL |
| – | – |
| ... | ... |
| ID-999 | UNRECOGNIZABLE |

| MOTHER PATTERN | ATTRIBUTE OF TARGET OBJECT | | | | | | VEHICLE INFORMATION | | | ENVIRONMENT INFORMATION |
|---|---|---|---|---|---|---|---|---|---|---|
| ID | SIZE | RADAR REFLECTIVITY | MOVEMENT ROUTE | OBJECT SPEED | OVERLAPPED AREA | DISTANCE FROM OBJECT | VEHICLE SPEED | DECELERATION /ACCELERATION | LANE INFORMATION (LANE OF VEHICLE/TOTAL LANES) | ROAD INFORMATION |
| ID-38 (STYROFOAM) | 35cm | 28% | DIRECTION OF -90 DEGREES | 10cm/s | 45% | 40m | 60km/h | 60km/h | L1 / L3 | HIGHWAY |

| ID | Case No. | ATTRIBUTE OF TARGET OBJECT ||||||| VEHICLE INFORMATION |||| ENVIRONMENT INFORMATION | SIMILARITY |
| | | SIZE | RADAR REFLECTIVITY | MOVEMENT ROUTE | OBJECT SPEED | OVERLAPPED AREA | DISTANCE FROM OBJECT | VEHICLE SPEED | DECELERATION /ACCELERATION | LANE INFORMATION | | ROAD INFORMATION | |
|---|---|---|---|---|---|---|---|---|---|---|---|---|---|
| ID-38 (STYROFOAM) | 1 | 35cm | 30% | 170 DEGREES | 12cm/s | 40% | 43m | 60km/h | -0.1 | L1 / L3 | | HIGHWAY | 0.8715 |
| | 2 | 10cm | 35% | (0)STOP | 0cm/s | 100% | 60m | 75km/h | -0.2 | L1 / L4 | | NATIONAL ROAD | 0.5715 |
| | 3 | 1m | 40% | 75 DEGREES | 5cm/s | 70% | 65m | 40km/h | 0.4 | L3 / L4 | | LOCAL ROAD | 0.6185 |
| | 4 | 32cm | 28% | -177 DEGREES | 11cm/s | 44% | 35m | 55km/h | 0 | L1 / L3 | | HIGHWAY | 0.8667 |
| | ... | ... | ... | ... | ... | ... | ... | ... | ... | ... | | ... | ... |
| | N | 70cm | 7% | -90 DEGREES | 1m/s | 57% | 70m | 120km/h | 0.6 | L2 / L4 | | HIGHWAY | 0.0882 |

EXTRACT SIMILARITY THAT IS NOT LESS THAN THRESHOLD VALUE (E.G., 0.85)

<502>

| ID | Case No. | ATTRIBUTE OF TARGET OBJECT ||||||| VEHICLE INFORMATION |||| ENVIRONMENT INFORMATION | SIMILARITY |
| | | SIZE | RADAR REFLECTIVITY | MOVEMENT ROUTE | OBJECT SPEED | OVERLAPPED AREA | DISTANCE FROM OBJECT | VEHICLE SPEED | DECELERATION /ACCELERATION | LANE INFORMATION | | ROAD INFORMATION | |
|---|---|---|---|---|---|---|---|---|---|---|---|---|---|
| ID-38 (STYROFOAM) | 1 | 35cm | 30% | 170 DEGREES | 12cm/s | 40% | 43m | 60km/h | -0.1 | L1 / L3 | | HIGHWAY | 0.8715 |
| | 4 | 10cm | 28% | 177 DEGREES | 10cm/s | 44% | 35m | 55km/h | 0 | L1 / L3 | | HIGHWAY | 0.8667 |
| | 9 | 1m | 33% | -180 DEGREES | 9cm/s | 30% | 37m | 50km/h | 0.1 | L1 / L3 | | HIGHWAY | 0.8503 |
| | 17 | 32cm | 28% | -165 DEGREES | 15cm/s | 37% | 41m | 65km/h | -0.1 | L1 / L3 | | HIGHWAY | 0.8712 |
| | ... | ... | ... | ... | ... | ... | ... | ... | ... | ... | | ... | ... |
| | 65248 | 70cm | 30% | -171 DEGREES | 11cm/s | 41% | 42m | 61km/h | 0 | L1 / L3 | | HIGHWAY | 0.8882 |

FIG.5

| ID | Case No. | ATTRIBUTE OF TARGET OBJECT ||||||| VEHICLE INFORMATION |||| ENVIRONMENT INFORMATION || WHETHER TO DERIVE CASE |
| | | SIZE | RADAR REFLECTIVITY | MOVEMENT ROUTE | OBJECT SPEED | OVERLAPPED AREA | DISTANCE FROM OBJECT | VEHICLE SPEED | DECELERATION /ACCELERATION | LANE INFORMATION | | ROAD INFORMATION | COINCIDENCE | |
|---|---|---|---|---|---|---|---|---|---|---|---|---|---|---|
| MARGIN | — | ±5cm | ±3% | ±5DEGREES | ±5cm/s | ±5% | ±5m | ±5 km/h | ±0.05 | COINCIDENCE | | COINCIDENCE | | |
| ID-38 (STYROFOAM) | 1 | 34cm | 30% | 170DEGREES | 11cm/s | 41% | 38m | 60km/h | -0.13 | L1 / L3 | | HIGHWAY | | O |
| | 2 | 34cm | 30% | 175DEGREES | 12cm/s | 40% | 60m | 60km/h | -0.13 | L1 / L3 | | HIGHWAY | | X |
| | 3 | 1m | 40% | 75DEGREES | 5cm/s | 70% | 24m | 40km/h | 0.4 | L3 / L4 | | LOCAL ROAD | | X |
| | 4 | 30cm | 31% | -177DEGREES | 11.5cm/s | 44% | 42m | 55km/h | -0.22 | L1 / L3 | | HIGHWAY | | O |
| ⋮ | ⋮ | ⋮ | ⋮ | ⋮ | ⋮ | ⋮ | ⋮ | ⋮ | ⋮ | ⋮ | | ⋮ | | ⋮ |

FIG. 6

| SCENARIO | ACCELERATION /DECELERATION | STEERING ANGLE | DESCRIPTION |
| --- | --- | --- | --- |
| 1 | 0 | LEFT 3 DEGREES | UNDERSTEERING FIRST STEP |
| 2 | 0 | LEFT 6 DEGREES | UNDERSTEERING SECOND STEP |
| 3 | 0 | LEFT 10 DEGREES | UNDERSTEERING THIRD STEP |
| 4 | 0 | LEFT 15 DEGREES | UNDERSTEERING FIRST STEP |
| 5 | 0 | LEFT 20 DEGREES | UNDERSTEERING SECOND STEP |
| 6 | 0 | LEFT 25 DEGREES | UNDERSTEERING THIRD STEP |
| 7 | -0.1 | 0 DEGREE | DECELERATION FIRST STEP |
| 8 | -0.2 | 0 DEGREE | DECELERATION SECOND STEP |
| 9 | -0.4 | 0 DEGREE | DECELERATION THIRD STEP |
| 10 | -0.1 | LEFT 3 DEGREES | UNDERSTEERING & DECELERATION FIRST STEP |
| ... | ... | ... | ... |
| N | -1 | 0 | SUDDEN STOP |

FIG.7

| ID | Case No. | ATTRIBUTE OF TARGET OBJECT ||||| VEHICLE INFORMATION |||| ENVIRONMENT INFORMATION | SIMILARITY | SCENARIO | WHETHER ACCIDENT OCCURS |
| | | SIZE | RADAR REFLECTIVITY | MOVEMENT ROUTE | OBJECT SPEED | OVERLAPPED AREA | VEHICLE SPEED | DECELERATION /ACCELERATION | LANE INFORMATION | ROAD INFORMATION | | | |
|---|---|---|---|---|---|---|---|---|---|---|---|---|---|
| ID-38 (STYROFOAM) | 1 | 35cm | 30% | 175 DEGREES | 12cm/s | 40% | 60km/h | -0.1 | L1 / L3 | HIGHWAY | 0.8715 | 1 | O |
| | 4 | 32cm | 28% | 170 DEGREES | 10cm/s | 44% | 55km/h | 0 | L1 / L3 | HIGHWAY | 0.8667 | 3 | X |
| | 9 | 37cm | 33% | -180 DEGREES | 9cm/s | 30% | 50km/h | 0.1 | L1 / L3 | HIGHWAY | 0.8503 | 7 | X |
| | 17 | 32cm | 28% | -165 DEGREES | 15cm/s | 37% | 65km/h | -0.1 | L1 / L3 | HIGHWAY | 0.8712 | 2 | O |
| | ... | ... | ... | ... | ... | ... | ... | ... | ... | ... | ... | ... | ... |
| | 165248 | 40cm | 30% | -171 DEGREES | 11cm/s | 41% | 61km/h | 0 | | HIGHWAY | 0.8882 | 17 | X |

| SCENARIO | ACCELERATION /DECELERATION | STEERING ANGLE | DESCRIPTION | ACCIDENT RATE |
|---|---|---|---|---|
| 1 | 0 | LEFT 3 DEGREES | UNDERSTEERING FIRST STEP | 0.11 |
| 2 | 0 | LEFT 6 DEGREES | UNDERSTEERING SECOND STEP | 0.09 |
| 3 | 0 | LEFT 10 DEGREES | UNDERSTEERING THIRD STEP | 0.07 |
| 4 | 0 | LEFT 15 DEGREES | UNDERSTEERING FIRST STEP | 0.06 |
| 5 | 0 | LEFT 20 DEGREES | UNDERSTEERING SECOND STEP | 0.04 |
| 6 | 0 | LEFT 25 DEGREES | UNDERSTEERING THIRD STEP | 0.13 |
| 7 | -0.1 | 0 DEGREE | DECELERATION FIRST STEP | 0.09 |
| 8 | -0.2 | 0 DEGREE | DECELERATION SECOND STEP | 0.04 |
| 9 | -0.4 | 0 DEGREE | DECELERATION THIRD STEP | 0.03 |
| 10 | -0.1 | LEFT 3 DEGREES | UNDERSTEERING & DECELERATION FIRST STEP | 0.01 |
| ... | ... | ... | ... | ... |
| N | -1 | 0 | SUDDEN STOP | 0.12 |

<902>

| PRIORITY | SCENARIO | ACCELERATION /DECELERATION | STEERING ANGLE | DESCRIPTION | ACCIDENT RATE |
|---|---|---|---|---|---|
| 1 | 10 | -0.1 | LEFT 3 DEGREES | UNDERSTEERING & DECELERATION FIRST STEP | 0.01 |
| 2 | 9 | -0.4 | 0 DEGREE | DECELERATION THIRD STEP | 0.03 |
| 3 | 5 | 0 | LEFT 20 DEGREES | UNDERSTEERING SECOND STEP | 0.04 |
| 4 | 4 | 0 | LEFT 15 DEGREES | UNDERSTEERING FIRST STEP | 0.06 |
| 5 | 3 | 0 | LEFT 10 DEGREES | UNDERSTEERING THIRD STEP | 0.07 |
| 6 | 2 | 0 | LEFT 6 DEGREES | UNDERSTEERING SECOND STEP | 0.09 |
| 7 | 7 | -0.1 | 0 DEGREE | DECELERATION FIRST STEP | 0.09 |
| 8 | 1 | 0 | LEFT 3 DEGREES | UNDERSTEERING FIRST STEP | 0.11 |
| 9 | N | -1 | 0 | SUDDEN STOP | 0.12 |
| 10 | 6 | 0 | LEFT 25 DEGREES | UNDERSTEERING THIRD STEP | 0.13 |
| ... | ... | ... | ... | ... | ... |
| N | 18 | -1 | LEFT 10 DEGREES | SUDDEN STOP | 0.21 |

APPARATUS FOR MANAGING DRIVING PATTERN BASED ON OBJECT RECOGNITION, VEHICLE DRIVING CONTROLLING APPARATUS USING THE SAME AND METHOD THEREOF

CROSS-REFERENCE TO RELATED APPLICATION

The present application claims priority to and the benefit of Korean Patent Application No. 10-2018-0156550, filed on Dec. 7, 2018, which is incorporated herein by reference in its entirety.

TECHNICAL FIELD

The present disclosure relates to an object recognition-based driving pattern managing server, a driving control apparatus of a vehicle using the same, and a method thereof.

BACKGROUND

The statements in this section merely provide background information related to the present disclosure and may not constitute prior art.

Nowadays, with the development of vehicle technology, the autonomous driving-related technology, which is automatically driven by a system, is being developed rapidly. Such the autonomous driving technology is implemented in such a way to control vehicle behavior after vehicle peripheral information is recognized and then a driving strategy is established and determined based on the recognized information.

However, in the case of recognizing the vehicle peripheral information, the conventional technology recognizes a specific object such as a vehicle, a pedestrian, a bicycle, a truck, and a motorcycle and determines a vehicle controlling method for a specific object to control the behavior of the vehicle depending on the determination result.

That is, the conventional autonomous driving system cannot help simplifying the vehicle control strategy (stop, deceleration, avoidance, or the like) in the case of an object not recognized by the autonomous driving system, by recognizing only the specific object specified in the autonomous driving system to control the behavior of the vehicle. As such, it is difficult for the conventional autonomous driving system to change the driving strategy of a vehicle depending on the risk of the situation according to the type of an object.

SUMMARY

In some forms of the present disclosure provides an object recognition-based driving pattern managing server that recognizes an object based on big data and determines a driving pattern according to the type and attribute of the recognized object to diversify a vehicle control strategy, a driving control apparatus of a vehicle using the same, and a method thereof.

The technical problems to be solved by the present inventive concept are not limited to the aforementioned problems, and any other technical problems not mentioned herein will be clearly understood from the following description by those skilled in the art to which the present disclosure pertains.

In some forms of the present disclosure, a server may include a processor recognizing a target object extracted from image information and determining a priority for each vehicle behavior scenario based on an accident rate for each vehicle behavior scenario among patterns similar to a mother pattern of the recognized target object to transmit the priority for each vehicle behavior scenario to a vehicle and a storage storing at least one or more of information about an image similar to the target object, target object information, pattern information for each target object, vehicle behavior scenario information, and priority information for each target object-based vehicle behavior scenario that are obtained by the processor.

In some forms of the present disclosure, the processor may be configured to receive image information about an unrecognized target object from the vehicle, after clustering the target object in the image information, to resize an image of the clustered target object, and to search for an image, which is similar to the resized image of the target object, in the information about the image similar to the target object to recognize the target object based on type and attribute tag information of the found similar image.

In some forms of the present disclosure, the processor may be configured to generate a target object ID of the recognized target object.

In some forms of the present disclosure, the processor may be configured to generate the mother pattern including at least one or more of an attribute of the target object, vehicle information, and environment information when the recognition of the target object is completed.

In some forms of the present disclosure, the processor may be configured to compare the mother pattern of the target object with the pattern information for each target object to extract patterns, each of which is similar to the mother pattern, in the pattern information for each target object.

In some forms of the present disclosure, the processor may be configured to extract patterns for each target object having a value less than a value from adding a value of the mother pattern and a margin value, as patterns of high similarity.

In some forms of the present disclosure, the processor may be configured to calculate similarity between the mother pattern of the target object and the pattern information for each target object and to extract patterns, similarity of each of which is not less than a reference value, in the pattern information for each target object.

In some forms of the present disclosure, the processor may be configured to calculate the accident rate for each vehicle behavior scenario based on information about whether an accident occurs for each vehicle behavior scenario of patterns, each of which is similar to the mother pattern.

In some forms of the present disclosure, the processor may be configured to calculate the accident rate for each vehicle behavior scenario by dividing the number of patterns, in each of which an accident occurs when the vehicle moves depending on a first vehicle behavior scenario, from among patterns for each target object, by the number of patterns, in each of which the vehicle moves depending on the first vehicle behavior scenario, from among patterns each of which is similar to the mother pattern.

In some forms of the present disclosure, the processor may be configured to determine a vehicle behavior scenario priority of the target object depending on the accident rate for each vehicle behavior scenario in descending order of an accident rate.

In some forms of the present disclosure, the vehicle behavior scenario may include information about acceleration/deceleration and steering angle for vehicle behavior.

In some forms of the present disclosure, the processor may be configured to update at least one or more of the pattern information for each target object, the vehicle behavior scenario information, and the priority information for each target object-based vehicle behavior scenario which are stored in the storage, when receiving a vehicle control result from the vehicle.

In some forms of the present disclosure, a driving control apparatus of a vehicle may include a processor analyzing sensing information and image information to recognize a target object, performing a vehicle behavior scenario of the recognized target object, and requesting a server to recognize the target object when the recognition of the target object fails, and a storage storing at least one or more of information about an image similar to the target object for the recognition of the target object, target object information, and priority information for each target object-based vehicle behavior scenario for a vehicle behavior.

In some forms of the present disclosure, the processor may be configured to update the target object information, vehicle behavior scenario information, and the priority information for each target object-based vehicle behavior scenario, when receiving a target object ID, the vehicle behavior scenario, and priority information for each vehicle behavior scenario from the server.

In some forms of the present disclosure, the processor may be configured to control the vehicle behavior depending on priority information for each vehicle behavior scenario received from the server.

In some forms of the present disclosure, the processor may be configured to transmit a result of performing the vehicle behavior scenario to the server.

In some forms of the present disclosure, an object recognition-based driving pattern managing method may include recognizing a target object extracted from image information, extracting patterns each of which is similar to a mother pattern of the recognized target object, determining a priority for each vehicle behavior scenario based on an accident rate for each vehicle behavior scenario among patterns each of which is similar to the mother pattern, and transmitting information about the priority for each vehicle behavior scenario, to a vehicle.

In some forms of the present disclosure, the recognizing of the target object may include receiving image information about an unrecognized target object from the vehicle, after clustering the target object in the image information, resizing an image of the clustered target object, searching for an image, which is similar to the resized image of the target object, in the information about an image similar to the target object to recognize the target object based on type and attribute tag information of the found similar image, and generating a target object ID of the recognized target object.

In some forms of the present disclosure, the extracting of the patterns each of which is similar to the mother pattern may include generating the mother pattern including at least one or more of an attribute of the target object, vehicle information, and environment information and comparing the mother pattern with pattern information for each target object to extract patterns, each of which is similar to the mother pattern, in the pattern information for each target object.

In some forms of the present disclosure, the determining of the priority for each vehicle behavior scenario may include calculating an accident rate for each vehicle behavior scenario based on information about whether an accident occurs for each vehicle behavior scenario of patterns, each of which is similar to the mother pattern and determining a vehicle behavior scenario priority of the target object depending on the accident rate for each vehicle behavior scenario in descending order of an accident rate.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a view for describing a method for updating a target object database in one form of the present disclosure;

FIG. 4 is an exemplary view of a mother pattern for establishing a vehicle behavior scenario in one form of the present disclosure;

FIG. 5 is a view for describing a method in which a server calculates similarity between a mother pattern and a case on a target object database in one form of the present disclosure;

FIG. 6 is a view for describing an example in which a server calculates similarity between a mother pattern and a case on a target object database in one form of the present disclosure;

FIG. 7 is an exemplary table of a vehicle behavior scenario according to a target object and an attribute, which is stored in a server in one form of the present disclosure;

FIG. 8 is an exemplary view including information about occurrence of an accident for each vehicle behavior scenario of the extracted similar case, which is stored in a server in one form of the present disclosure;

FIG. 9 is a priority determining method of a vehicle behavior scenario in one form of the present disclosure;

Figure 1:
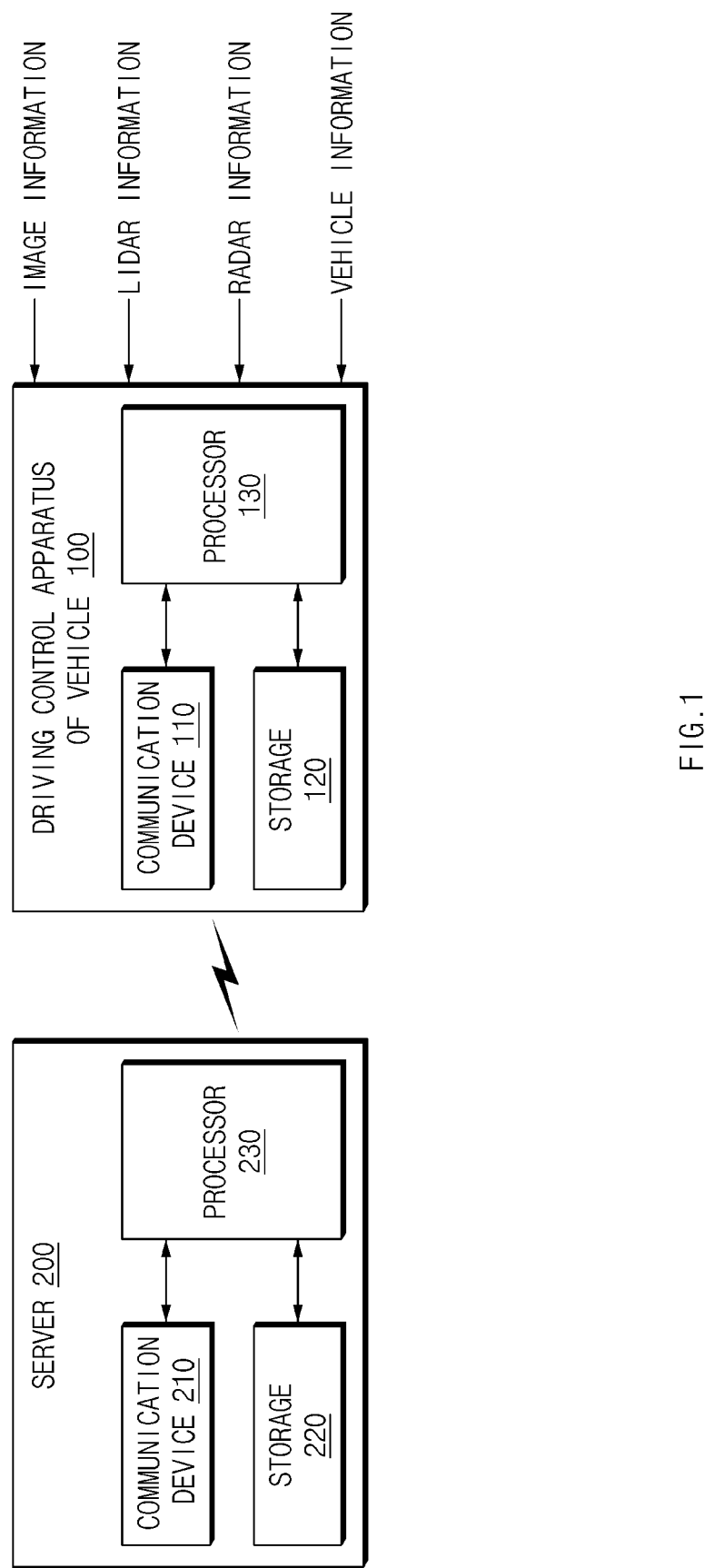
FIG. 1 is a block diagram illustrating a configuration of a vehicle driving control system including a driving control apparatus of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of some forms of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

The present disclosure discloses a configuration that makes a request for the recognition of a target object to a server and receives a vehicle behavior scenario for the recognized target object and priority information according to an accident rate to perform vehicle behavior control, when an autonomous driving vehicle fails to recognize a target object at a periphery of the vehicle.

Below, various forms of the present disclosure will be described in detail with reference to FIGS. 1 to 13.

FIG. 1 is a block diagram illustrating a configuration of a vehicle driving control system including a driving control apparatus of a vehicle in some forms of the present disclosure.

Referring to FIG. 1, a vehicle driving control system in some forms of the present disclosure may perform the vehicle driving control by increasing the object recognition success rate through interworking between a driving control apparatus 100 of a vehicle and a server 200.

The driving control apparatus 100 of a vehicle may recognize a target object based on image information and sensing information, may search for a vehicle behavior scenario depending on the recognized target object, and may control the vehicle.

To this end, the driving control apparatus 100 of a vehicle may include a communication device 110, storage 120, and a processor 130.

The communication device 110 may be a hardware device implemented with various electronic circuits for transmitting and receiving signals via a wireless or wired connection; in the present disclosure, the communication device 110 may perform communication with the server 200.

The storage 120 stores an object recognition database (information about an image similar to a target object), a target object database (target object information), and a vehicle behavior scenario priority database (vehicle behavior scenario information for each target object). That is, the storage 120 may store the information about an image similar to a target object, target object information, pattern information for each target object, vehicle behavior scenario information, priority information for each target object-based vehicle behavior scenario, and the like, which are obtained by the processor 130 or are received from the server 200. The information about an image similar to the target object may include big data of similar images for searching for an image similar to the target object (refer to 204 of FIG. 2A later); the target object information may include a list including attribute or type information of a target object for each target object ID (refer to FIG. 3 later). The priority information for each target object-based vehicle behavior scenario includes a priority list for each scenario according the corresponding target object (refer to FIG. 9 later).

The storage 120 may include at least one type of a storage medium among a flash memory type of a memory, a hard disk type of a memory, a micro type of a memory, and a card type (e.g., a Secure Digital (SD) card or an eXtream Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and an optical disc type of a memory.

The processor 130 may be electrically connected to the communication device 110, the storage 120 or the like, may electrically control each of the components, may be an electrical circuit that executes the instructions of the software, and may perform various data processing and calculation described below.

The processor 130 may analyze sensing information and image information to perform target object recognition, may perform the vehicle behavior scenario on the recognized target object, and may make a request for the target object recognition to the server 200 when the target object recognition fails.

When receiving a target object ID, a vehicle behavior scenario, and priority information for each vehicle behavior scenario from the server 200, the processor 130 may update the target object information, the vehicle behavior scenario information and the priority information for each target object-based vehicle behavior scenario.

The processor 130 may control vehicle behavior depending on the priority information for each vehicle behavior scenario received from the server 200 and may transmit the result of controlling the vehicle behavior to the server 200.

Although not illustrating a camera, a radar sensor, a LiDAR sensor, or the like, the present disclosure may receive and use image information and sensing information from the sensors. At this time, the driving control apparatus 100 of a vehicle may obtain attribute information of a target object (external object), vehicle information, environment information or the like through the image information and the sensing information. To this end, the driving control apparatus 100 of a vehicle may further use an ultrasonic sensor, a laser scanner and/or corner radar, an acceleration sensor, a yaw rate sensor, a torque measurement sensor and/or a wheel speed sensor, or the like as well as a radar, a camera, and a LiDAR sensor.

The server 200 is a device for changing an object recognition-based driving pattern; the server 200 clusters and resizes the target object in the image information, searches for a similar image in an image database in the server 200, and generates a target object ID after performing the recognition of the unrecognized target object based on type and attribute information of the found similar image, when receiving image information and sensing information about an unrecognized target object from the driving control apparatus 100 of a vehicle. As such, the server 200 stores the target object ID of the recognized target object in the target object database of the server 200 and also transmits the target object ID to the driving control apparatus 100 of a vehicle to share the target object ID in the target object database of the driving control apparatus 100 of a vehicle. Moreover, the server 200 determines a vehicle behavior scenario priority for the target object ID to transmit the vehicle behavior scenario priority for the target object ID to the driving control apparatus 100 of a vehicle.

To this end, the server 200 may include a communication device 210, storage 220, and a processor 230.

The communication device 210 may be a hardware device implemented with various electronic circuits for transmitting and receiving signals via a wireless or wired connection; in the present disclosure, the communication device 210 may perform communication with the driving control apparatus 100 of a vehicle.

The storage 220 may store the information about an image similar to a target object, target object information, pattern information for each target object, vehicle behavior scenario information, priority information for each target object-based vehicle behavior scenario, and the like, which are obtained by the processor 230 or are received from the driving control apparatus 100 of a vehicle. That is, the storage 220 stores a target object database and a vehicle behavior scenario priority database; the target object database and the vehicle behavior scenario priority database are updated in conjunction with the target object database and the vehicle behavior scenario priority database of the driving control apparatus 100 of a vehicle. The information about an image similar to the target object may include big data of similar images for searching for an image similar to the target object (refer to 204 of FIG. 2A later); the target object information may include a list including attribute or type information of a target object for each target object ID (refer to FIG. 3 later). The pattern information for each target object may be case information for each target object and may include the attribute of a target object, vehicle information, environment information, whether accident occurs, or the like for each pattern (case) (refer to FIGS. 4 and 5 later). The vehicle behavior scenario information is vehicle behavior information and includes scenarios that adjust the levels of acceleration/deceleration and steering angle (refer to FIG. 7 later). The priority information for each target object-based vehicle behavior scenario includes a priority list for each scenario according the corresponding target object (refer to FIG. 9 later).

The storage 220 may include at least one type of a storage medium among a flash memory type of a memory, a hard disk type of a memory, a micro type of a memory, and a card type (e.g., a Secure Digital (SD) card or an eXtream Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and an optical disc type of a memory.

The processor 230 may be electrically connected to the communication device 210, the storage 220 or the like, may electrically control each of the components, may be an electrical circuit that executes the instructions of the software, and may perform various data processing and calculation described below.

The processor 230 may perform recognition of a target object extracted from image information and may determine a priority for each vehicle behavior scenario based on an accident rate for each vehicle behavior scenario among patterns (cases) similar to a mother pattern of the recognized target object to transmit the priority for each vehicle behavior scenario to a vehicle.

The processor 230 may receive image information about the unrecognized target object from the vehicle, may resize the target object in the image information after clustering the target object, may search for an image, which is similar to an image of the resized target object, in information about an image similar to a target object, may recognize the target object based on type and attribute tag information of the found similar image, and may generate a target object ID of the recognized target object.

The processor 230 may generate a mother pattern including at least one or more of an attribute of a target object, vehicle information, and environment information, when the recognition of the target object is completed. The attribute of a target object may include a size, radar reflectivity, movement route, object speed, overlapped area (a range in which a vehicle route and a target object overlap with each other), a distance from an object, or the like. The vehicle information may include a vehicle speed, deceleration/acceleration, lane information, or the like, and the environment information may include road information (the type of a road, or the like). The mother pattern will be described in detail with reference to FIG. 4.

The processor 230 may compare the mother pattern of the target object with the pattern information for each target object to extract patterns, each of which is similar to the mother pattern, in the pattern information for each target object. Moreover, the processor 230 may extract patterns for each target object having a value less than a value from adding a value of the mother pattern and a margin value, to a pattern of high similarity. Furthermore, the processor 230 may calculate the similarity between the mother pattern of the target object and the pattern information for each target object to extract patterns, the similarity of each of which is not less than a reference value, in the pattern information for each target object. The method for extracting a pattern similar to the mother pattern will be described in detail with reference to FIGS. 5 and 6.

The processor 230 may calculate an accident rate for each vehicle behavior scenario based on information about whether an accident occurs for each vehicle behavior scenario of patterns, each of which is similar to the mother pattern. That is, the processor 230 may calculate the accident rate for each vehicle behavior scenario by dividing the number of patterns, in each of which an accident occurs when the vehicle moves depending on a first vehicle behavior scenario, from among patterns for each target object, by the number of patterns, in each of which the vehicle moves depending on the first vehicle behavior scenario, from among patterns each of which is similar to the mother pattern. At this time, the vehicle behavior scenario may include acceleration/deceleration and steering angle information for vehicle behavior. At this time, the information about whether an accident occurs may be updated from the driving control apparatus 100 of a vehicle whenever a vehicle moves and may be stored in advance for each pattern (case). A vehicle behavior scenario and an example of calculating an accident rate for each vehicle behavior scenario will be described with reference to FIGS. 7 to 9.

The processor 230 may determine the vehicle behavior scenario priority of the target object depending on the accident rate for each vehicle behavior scenario in descending order of the accident rate. Furthermore, the processor 230 may update at least one or more of the pattern information for each target object, the vehicle behavior scenario information, and the priority information for each target object-based vehicle behavior scenario which are stored in the storage 120, when receiving a vehicle control result from the vehicle.

As such, when the appearance of objects not recognized by the vehicle affects the progress of the vehicle during autonomous driving, the present disclosure determines the type and attribute of an unrecognized object in the server, and changes the driving pattern of the vehicle depending on the determined type and attribute to provide the changed driving pattern to the vehicle, thereby enabling more secure and reliable autonomous driving control.

Moreover, the present disclosure may improve autonomous driving stability, using only the software change such as the transmission of data of a vehicle to the server, the object information analysis through big data processing, the deriving of a vehicle behavior scenario, driving control according to a vehicle behavior scenario, or the like without changing hardware.

Figure 2A:
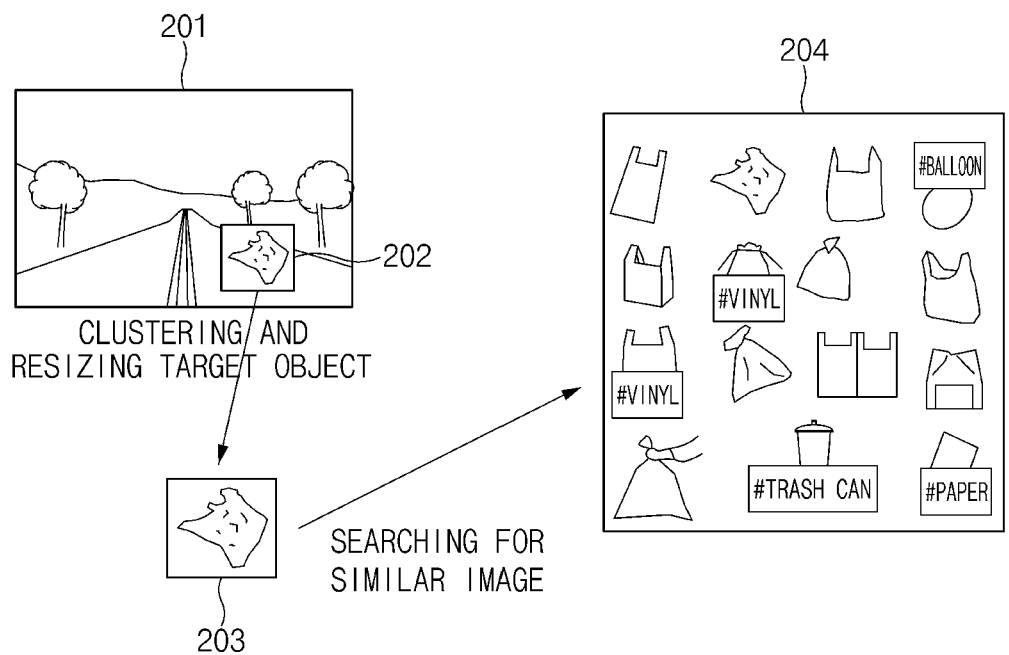
FIG. 2A is a view for describing a method for recognizing a target object in one form of the present disclosure.
Figure 2B:
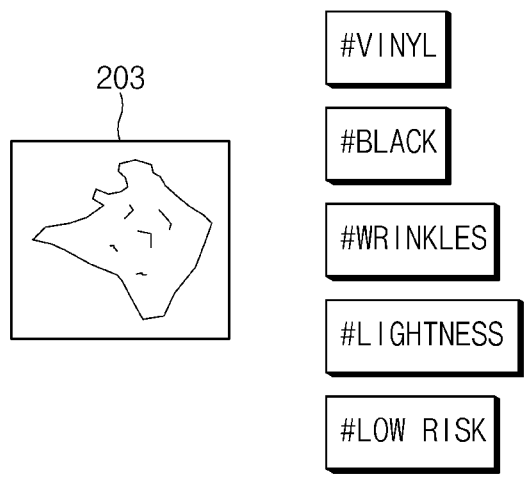
FIG. 2B is a view illustrating an example of a target object attribute in one form of the present disclosure.

FIG. 2A is a view for describing a method for recognizing a target object in some forms of the present disclosure. FIG. 2B is a view illustrating an example of a target object attribute in some forms of the present disclosure.

When the driving control apparatus 100 of a vehicle fails to recognize a target object, the driving control apparatus 100 of a vehicle transmits image information and sensing information to the server 200.

'201' of FIG. 2A is image information; the server 200 clusters and resizes a target object 202 from the image information 201, removes the surrounding image information as illustrated in '203', and leaves only a target object 204. At this time, the resizing is a method for easily comparing similarity by resizing the size of an image to be similar to the sizes of images stored in the storage 220 of the server 200.

Afterward, the server 200 searches the images stored in the storage 220 of the server 200 for the resized target object 203 to determine whether there is a similar image similar to the target object 203. The similar image may be found as illustrated in '204' of FIG. 2A. At this time, the storage 220 of the server 200 stores tag information such as the type or attribute (color, weight, risk, or the like) of the target object. At this time, because a result 204 of searching for an image similar to the target object may include an object of a type different from the target object type, the server 200 may determine the attribute values of object such as color, reflectivity, and the like, together, thereby increasing the accuracy. That is, the server 200 may filter an image, the attribute information of which is paper, a balloon, or a trash can, from the similar image search result of '204'.

FIG. 2B illustrates an example of the attribute information of the target object 202; the attribute information of the target object 202 may include information such as vinyl, black, wrinkles, lightness, low risk, or the like.

However, when the statistics of a specific level or more is not derived from the found similar images, (e.g., when the ratio of cases of the same type to all cases is less than the ratio defined by the server 200), the server 200 defines the target object as an unrecognizable object; the server 200 may control the behavior of the vehicle depending on the predefined scenario, when the target object is the unrecognizable object. For example, when the ratio of vinyl is 33%, the ratio of paper is 21%, the ratio of balloons is 25%, and the ratio of others is 21%, among the whole one million cases, each of the ratios is not satisfied when the ratio set by the server 200 is 50%. As such, the server 200 may analyze pieces of tag information of the found similar image to determine the attribute and the target object.

FIG. 3 is a view for describing a method for updating a target object database in some forms of the present disclosure.

When the server 200 recognizes a target object based on a similar image among pre-stored images, the server 200 may determine the type of a target object, may generate a target object ID to transmit the target object ID to the driving control apparatus 100 of a vehicle, and may allow a target object database to be updated. The server 200 may receive the list of the target object ID from the driving control apparatus 100 of a vehicle and may synchronize the same object target database with the driving control apparatus 100 of a vehicle to allow the driving control apparatus 100 of a vehicle to store the same object target database.

Referring to FIG. 3, '301' is an example in which the server 200 generates the new target object ID; '302' is an example in which the server 200 provides the target object ID and type information of the target object to the driving control apparatus 100 of a vehicle and updates the target object database included in the storage of the driving control apparatus 100 of a vehicle.

FIG. 4 is an exemplary view of a mother pattern for establishing a vehicle behavior scenario in some forms of the present disclosure.

Referring to FIG. 4, a mother pattern includes an attribute of a target object, vehicle information, and environment information for each target object ID.

The behavior strategy of a vehicle needs to be changed depending on the type and attribute of the target object. For example, when the size of the animal carcass is small, it may be safer to proceed as it is, when the size of the animal does not affect the behavior of a vehicle; in the case of a large animal carcass, because the size of the animal affects the behavior of a vehicle, it may be desirable to avoid the animal carcass. However, when a vehicle cannot avoid the animal carcass by the surrounding environment of the vehicle (when vehicles are close to both the left lane and the right lane, or the like) when trying to avoid the animal carcass, the vehicle behavior having the next priority needs to be determined. That is, when it is impossible to avoid the animal carcass, the vehicle needs to decelerate to avoid the animal carcass or needs to stop when it is impossible to avoid the animal carcass. At this time, a driver needs to determine in what priority the driver controls the vehicle, depending on the attribute of an object.

In some forms of the present disclosure, in FIG. 4, a target object is recognized as Styrofoam. The server 200 determines the attribute of a target object, vehicle information and road information, which can affect the behavior determination of a vehicle, as a mother pattern. At this time, the attribute of a target object may include a size, radar reflectivity, movement route, object speed, overlapped area (a range in which a vehicle route and a target object overlap with each other), a distance from an object, or the like. The vehicle information may include a vehicle speed, deceleration/acceleration, lane information, or the like, and the environment information may include road information.

That is, the risk of an accident may be changed depending on the attribute of the target object or vehicle information; a driving pattern may be changed depending on the state of a road; an avoidance method may be changed depending on a road environment, and thus the environment information may include road information. At this time, road information may be used as road information of navigation.

FIG. 5 is a view for describing a method in which a server calculates similarity between a mother pattern and a case on a target object database in some forms of the present disclosure. FIG. 6 is a view for describing an example in which a server calculates similarity between a mother pattern and a case on a target object database in some forms of the present disclosure.

As illustrated in '501' of FIG. 5, the server 200 may store big data including a lot of cases such as the attribute of a target object depending on the type of a target object, vehicle information at a point in time when the target object is recognized, road information at a point in time when the target object is recognized, or the like.

The server 200 calculates similarity by comparing a mother pattern of the target object recognized by the server 200 with pieces of pattern information of big data of '501' of FIG. 5. That is, the server 200 may calculate the similarity by comparing the attribute of the target object, vehicle information, and road information of the mother pattern with the attribute of the target object, vehicle information, and road information stored in the server 200 for each case, respectively.

Afterward, as illustrated in '502', the server 200 extracts cases, in each of which the similarity among similarities for each case is not less than a threshold value 'Cth' determined by the server 200. For example, the threshold value may be set to '0.85', and the range and magnitude of the threshold value may be changed depending on the performance of the server 200. Referring to '502' of FIG. 5, it is understood that all the cases in each of which the similarity is not less than 0.85 are collected.

The present disclosure may obtain the statistical nature of an accident by searching for data of a case similar to the attribute of the target object, information of the current vehicle, and environment information (road information). As such, it is important to calculate the similarity accurately; a method for calculating the similarity may be implemented with the various manners to be described below.

First, the server 200 may perform primary filtering through attribute values, which are accurately determined, such as lane information or road information, may perform normalization by dividing each of the values by the maximum value after determining the maximum value among the remaining attribute values, and may extract similar data based on a correlation value between a mother pattern and the pattern (case) of a database. In the case of using the correlation, as the similarity is closer to '1', the similarity may have positive correlation and the similarity may be higher; as the similarity is closer to '0', the similarity may be lower. At this time, the correlation may be obtained by dividing covariance by the square of the standard deviation.

Second, referring to FIG. 6, the server 200 may set each of the attribute values of the mother pattern, attribute information of the big data of the server 200, vehicle information of the big data of the server 200, and environment information (road information) of the big data of the server 200 to a margin value determined by the server 200, may extract only the cases in each of which each of the attribute values is less than the margin value, and may derive the similarity through an error rate indicating how much an attribute has a difference from the mother pattern.

The patterns (cases) in FIGS. 5 and 6 may include a scenario and information indicating whether an accident occurs, without illustrating the scenario and information indicating whether the accident occur.

FIG. 7 is an exemplary table of a vehicle behavior scenario according to a target object and an attribute, which is stored in a server in some forms of the present disclosure. FIG. 8 is an exemplary view including information about occurrence of an accident for each vehicle behavior scenario of the extracted similar case, which is stored in a server, in some forms of the present disclosure.

As illustrated in FIG. 7, a method for controlling a vehicle may be stored for each scenario in the server 200, and a vehicle behavior scenario may be composed of basic units each of which controls acceleration/deceleration and a steering angle.

The server 200 may subdivide the steps of acceleration/deceleration and steering angle and may derive a vehicle behavior scenario by using the combination thereof. For example, a scenario 1 may be to control a vehicle such that the acceleration/deceleration is 0 and the steering angle is left 3 degrees.

At this time, each basic control unit has size and directionality. For example, in the case of the acceleration/deceleration, '+' direction may have directionality of acceleration based on zero; '−' direction may have directionality of deceleration based on zero; as the value becomes greater, the degree of acceleration/deceleration may be stronger. In the case of steering, the directionality has the left ('−' direction) and the right ('+' direction) based on zero; as the value becomes greater, the steering angle may change from understeering to much oversteering.

At this time, the server 200 may subdivide the step of a basic control unit for each scenario based on the pre-stored accident scenario and accident rate. For example, because it is difficult for the difference of an accident rate for each behavior scenario to derive the statistical nature when the server 200 finely subdivides the step of acceleration/deceleration (e.g., 0.0001 units), the steps of the basic control unit may be determined to have the statistical nature of the accident rate for each behavior scenario.

As illustrated in FIG. 8, whether an accident occurs for each vehicle behavior scenario of the extracted similar case is also stored in the server 200.

FIG. 9 is a priority determining method of a vehicle behavior scenario in some forms of the present disclosure.

The server 200 calculates the accident rate for each vehicle behavior scenario from the extracted case and assigns the priority of the scenario with low accident rate to be high. That is, the server 200 may calculate the accident rate for each vehicle behavior scenario by dividing the number of patterns (cases), in each of which an accident occurs when the vehicle moves depending on a specific scenario, by the number of cases, in each of which the vehicle moves depending on the specific scenario. For example, when the vehicle moves depending on the scenario 1, the number of accident cases is 10; when the number of cases, in each of which the vehicle moves depending on the scenario 1, from among the extracted similar cases is 2, the accident rate may be 5.

'901' of FIG. 9 is an exemplary view of a table indicating an accident rate for each scenario; '902' of FIG. 9 is an exemplary view of a table in which a priority is determined based on the accident rate.

As such, the server 200 may determine the behavior strategy of a vehicle that is capable of minimizing the accident rate from big data of the situation similar to the type of an object recognized through a series of processes, the attribute of the object, the state of a current vehicle, and external information.

Moreover, the server 200 transmits the priority of the vehicle behavior scenario to the driving control apparatus 100 of a vehicle, and the driving control apparatus 100 of a vehicle determines the behavior of the vehicle depending on the received priority. For example, as illustrated in '902' of FIG. 9, the driving control apparatus 100 of a vehicle may control vehicle behavior depending on a scenario 9 of which the priority is the second, when the vehicle fails to move depending on a scenario 10 of which the priority is the first.

After controlling the vehicle depending on the determined vehicle behavior scenario, the driving control apparatus 100 of a vehicle transmits the vehicle control result to the server 200, and the server 200 stores the vehicle control result for each scenario.

Hereinafter, in some forms of the present disclosure, a vehicle driving controlling method of a vehicle driving control system will be described in detail with reference to FIG. 10. FIG. is a flowchart for describing a vehicle driving controlling method of a vehicle driving control system in some forms of the present disclosure.

Hereinafter, it is assumed that the vehicle driving control system of FIG. 1 performs the process of FIG. 10.

Figure 10:
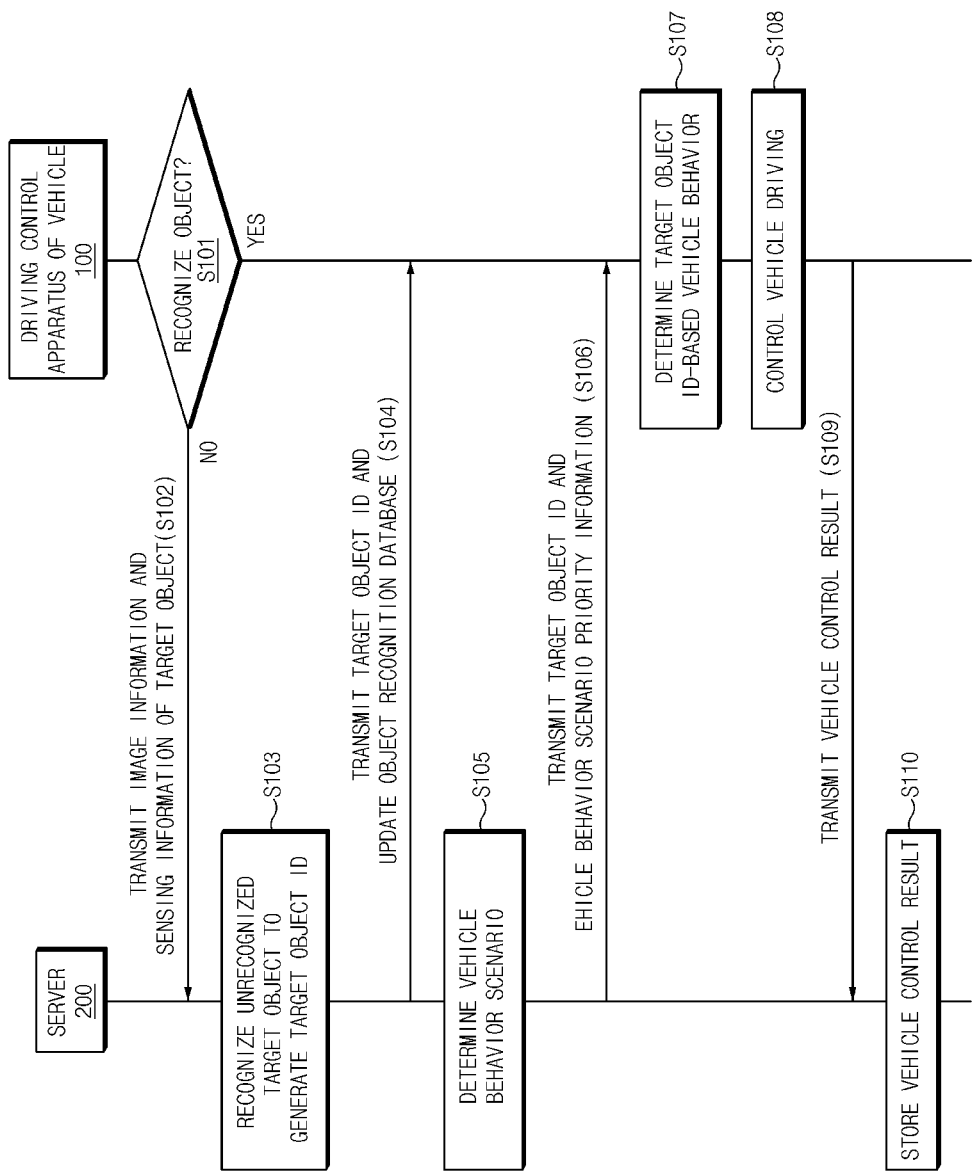
FIG. 10 is a flowchart for describing a vehicle driving controlling method of a vehicle driving control system in one form of the present disclosure.

Referring to FIG. 10, in operation S101, the driving control apparatus 100 of a vehicle performs object recognition, using information obtained from a LiDAR sensor, a radar sensor, a camera, or the like. At this time, the driving control apparatus 100 of a vehicle determines whether the object recognition is successful; in operation S102, the driving control apparatus 100 of a vehicle transmits image information to the server 200, when the object is not recognized.

Next, in operation S103, the server 200 recognizes an unrecognized target object based on the image information received from the driving control apparatus 100 of a vehicle to generate a target object ID, and then, in operation S104, the server 200 transmits the target object ID to the driving control apparatus 100 of a vehicle to allow the driving control apparatus 100 of a vehicle to update an object recognition database of the driving control apparatus 100 of a vehicle. As illustrated in FIG. 3, the object recognition database includes a table storing type information of a target object for each target object ID. That is, the driving control apparatus 100 of a vehicle may store and update the target object ID, which is newly generated by recognizing an unrecognized target object in the server 200, and type information thereof in an existing object recognition database.

Afterward, in operation S105, the server 200 determines a vehicle behavior scenario based on the target object ID; in operation S106, the server 200 transmits the target object ID and vehicle behavior scenario priority information to the driving control apparatus 100 of a vehicle. As illustrated in FIG. 4, the server 200 generates a mother pattern including the attribute of a target object, vehicle information, and environment information, based on sensing information and image information received from the driving control apparatus 100 of a vehicle and may compare the mother pattern with patterns of big data stored in the server 200 of FIG. 5 to extract the similar pattern (case). The server 200 determines a priority based on a scenario of patterns (cases) with high similarity and whether an accident occur, to transmit priority information to the driving control apparatus 100 of a vehicle.

As such, in operation S107, the driving control apparatus 100 of a vehicle determines target object ID-based vehicle behavior; in operation S108, the driving control apparatus 100 of a vehicle performs vehicle driving control depending on the determined vehicle behavior.

In the meantime, even when the object recognition is successful in operation S101, the driving control apparatus 100 of a vehicle may perform operation S107 and operation S108.

Next, in operation S109, the driving control apparatus 100 of a vehicle transmits a vehicle driving control result to the server 200; in operation S110, the server 200 stores the vehicle driving control result.

Figure 11:
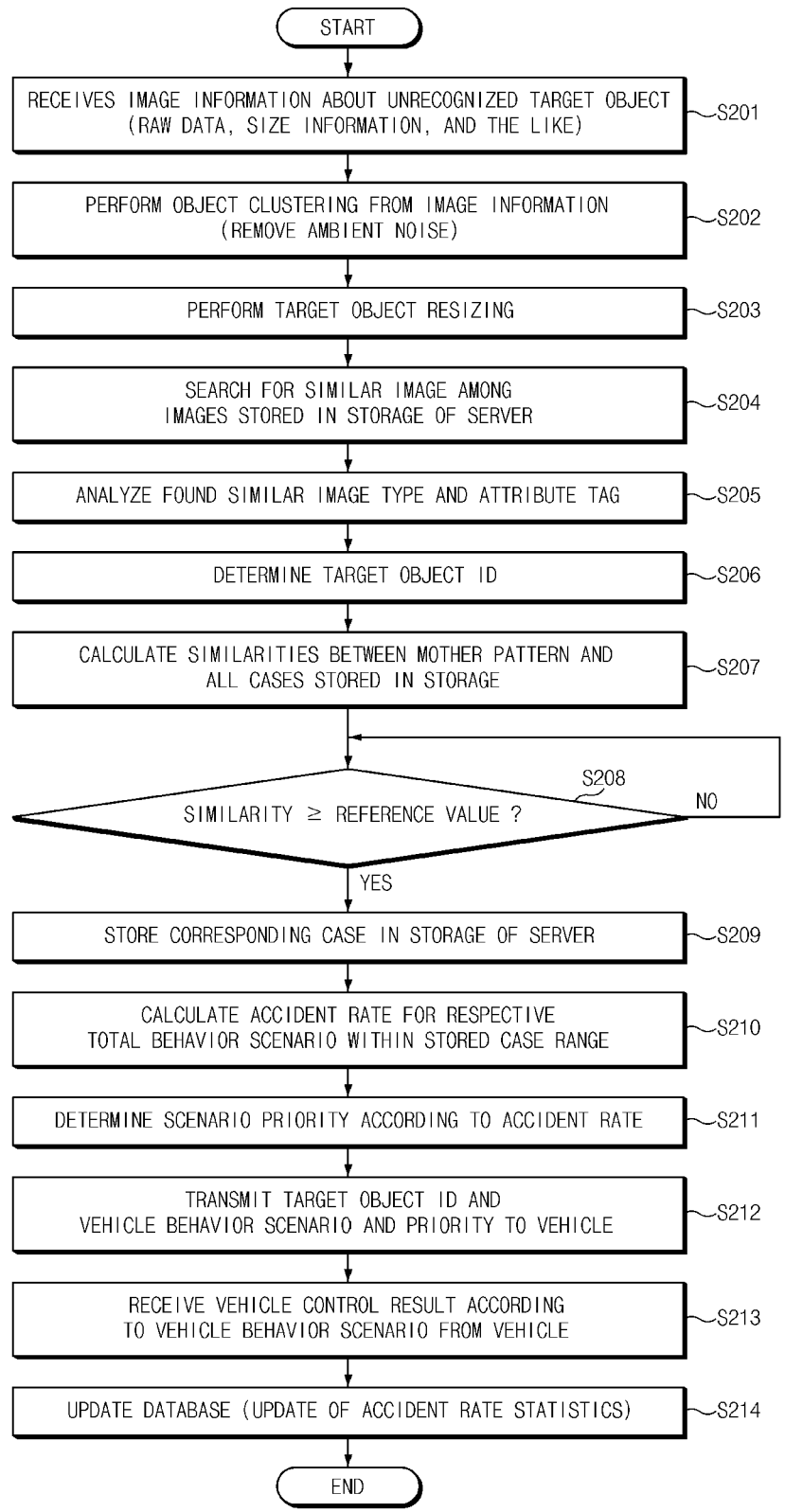
FIG. 11 is a flowchart for describing a vehicle driving controlling method of a server in one form of the present disclosure.

Hereinafter, in some forms of the present disclosure, a vehicle driving controlling method of a server will be described in detail with reference to FIG. 11. FIG. 11 is a flowchart for describing a vehicle driving controlling method of a server in some forms of the present disclosure.

Below, it is assumed that the server 200 of FIG. 1 performs a process of FIG. 11. In addition, in a description of FIG. 11, it may be understood that the described operation is controlled by the processor 230 of the server 200.

Referring to FIG. 11, when the server 200 receives image information (raw data and size information) about an unrecognized target object from the driving control apparatus 100 of a vehicle in operation S201, in operation S202, the server 200 removes ambient noise by performing target object clustering from the image information.

Next, in operation S203, the server 200 performs target object resizing on the clustered image; in operation S204, the server 200 determines whether an image similar to the resized target object is present by searching for the image stored in the storage 220 of the server 200.

As such, in operation S205, the server 200 analyzes the found similar image type and an attribute tag; in operation S206, the server 200 determines the target object ID. As illustrated in FIG. 2A, the server 200 may cluster only the target object in image information received from the driving control apparatus 100 of a vehicle and then may perform resizing; as illustrated in FIG. 2B, the server 200 may search for the similar image stored in the server 200, may analyze attribute tag information, and may determine a target object ID. Some forms of the present disclosure are exemplified in FIGS. 2A and 2B as the target object is black vinyl.

In operation S207, the server 200 calculates the similarities between a mother pattern and all the cases (patterns) stored in the storage 220. As such, in operation S208, the server 200 determines whether the similarity is greater than a reference value; in operation S209, the server 200 stores a case that the similarity is greater than the reference value, in the storage 220 of the server 200. As illustrated in FIG. 4, when the target object ID is ID-38 (Styrofoam), the server 200 obtains the attribute of the target object, vehicle information, and environment information through image information and sensing information received from the driving control apparatus 100 of a vehicle to generate the mother pattern. The server 200 compares the mother pattern with patterns from pre-stored big data to extract a similar case (pattern) and calculates the similarity of the similar case. That is, as illustrated in FIGS. 5 and 6, the server 200 may calculate the similarity for each case extracted as each similar case and may primarily list up cases in each of which the similarity is not less than the reference value. As illustrated in '502' of FIG. 5, the server 200 may store similar cases, which are listed up in ascending order of the similarity, in the storage 220.

Afterward, in operation S210, the server 200 calculates the accident rate for the respective total behavior scenario within the stored case range. That is, as illustrated in FIG. 8 and '901' of FIG. 9, the server 200 may calculate whether an accident occurs for each total behavior scenario of the stored similar cases, or the accident rate for each total behavior scenario.

In operation S211, the server 200 determines a scenario priority according to an accident rate; in operation S212, the server 200 transmits a target object ID and vehicle behavior scenario and priority to the driving control apparatus 100 of a vehicle. '902' of FIG. 9 illustrates information about a scenario in which a priority is determined in descending order of an accident rate.

Afterward, when the server 200 receives the vehicle control result according to the vehicle behavior scenario from the driving control apparatus 100 of a vehicle in operation S213, in operation S214, the server 200 updates a target object database such as the update of accident rate statistics, or the like.

Hereinafter, in some forms of the present disclosure, a vehicle driving controlling method of a vehicle driving control system will be described in detail with reference to FIG. 12. FIG. is a flowchart for describing a vehicle driving controlling method of a vehicle driving control system in some forms of the present disclosure.

Hereinafter, it is assumed that the vehicle driving control system of FIG. 1 performs the process of FIG. 12. In addition, as described in FIG. 12, it is understood that the operation described as being executed by the driving control apparatus 100 of a vehicle is controlled by the processor 130 of the driving control apparatus 100 of a vehicle.

Figure 12:
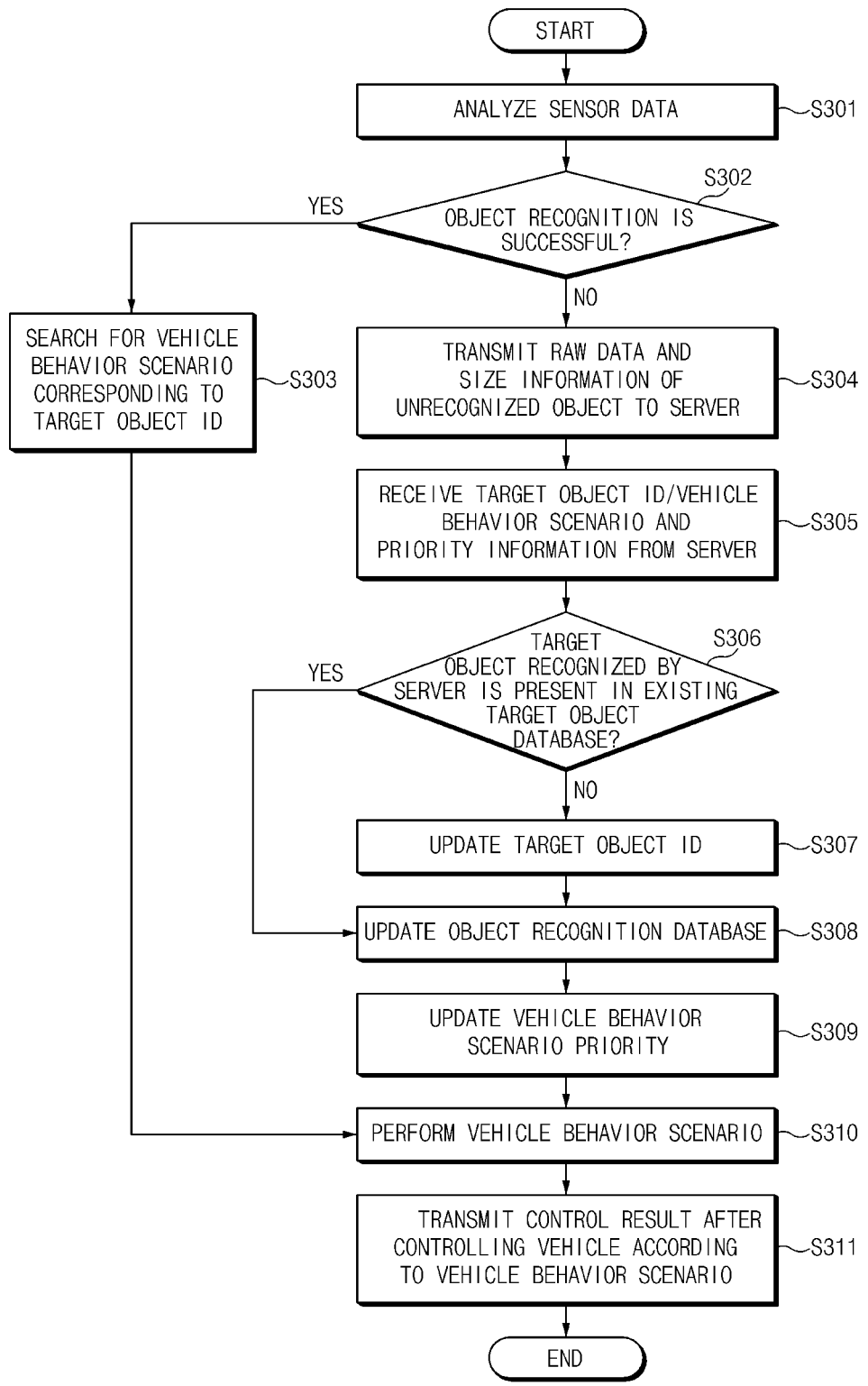
FIG. 12 is a flowchart for describing a vehicle driving controlling method of a driving control apparatus of a vehicle in one form of the present disclosure.

Referring to FIG. 12, in operation S301, the driving control apparatus 100 of a vehicle analyzes image information and sensing information received from a camera, a radar sensor, a LiDAR sensor, or the like; in operation S302, the driving control apparatus 100 of a vehicle performs object recognition.

When the object recognition is successful, the driving control apparatus 100 of a vehicle searches for a vehicle behavior scenario corresponding to a target object ID in operation S303, performs vehicle behavior control depending on the found vehicle behavior scenario in operation S310, and transmits the vehicle control result according to the vehicle behavior scenario to the server 200 in operation S311.

In the meantime, when the object recognition fails, in operation S304, the driving control apparatus 100 of a vehicle transmits sensing information and image information of an unrecognized object, to a server. At this time, the sensing information and the image information may include raw data and size information.

As such, in operation S305, the driving control apparatus 100 of a vehicle receives a target object ID, a vehicle behavior scenario, and priority information from the server 200; in operation S306, the driving control apparatus 100 of a vehicle determines whether the target object recognized by the server 200 is present in an existing target object database; when there is no target object, in operation S307 and operation S308, the driving control apparatus 100 of a vehicle updates target object database (attribute information for each target object ID) and object recognition database (similar image information), using the corresponding target object ID and type information in the target object database.

Afterward, in operation S309, the driving control apparatus 100 of a vehicle updates vehicle behavior scenario priority information received from the server 200; in operation S310, the driving control apparatus 100 of a vehicle performs vehicle behavior control depending on the vehicle behavior scenario with high priority; in operation S311, the driving control apparatus 100 of a vehicle transmits the vehicle control result according to the vehicle behavior scenario, to the server 200.

As such, the present disclosure may change a driving pattern according to the type and attribute of the target object, for driving safety in the autonomous driving step of a vehicle.

At this time, the recognition rate of surrounding objects needs to be improved at the high level autonomous driving in the autonomous driving steps. As such, in the present disclosure, the server 200 may recognize an unrecognized target object, which is not recognized by the driving control apparatus 100 of a vehicle, by operating in conjunction with the driving control apparatus 100 of a vehicle, and thus may improve the recognition rate of the target object, thereby improving the reliability of the autonomous driving system.

Figure 13:
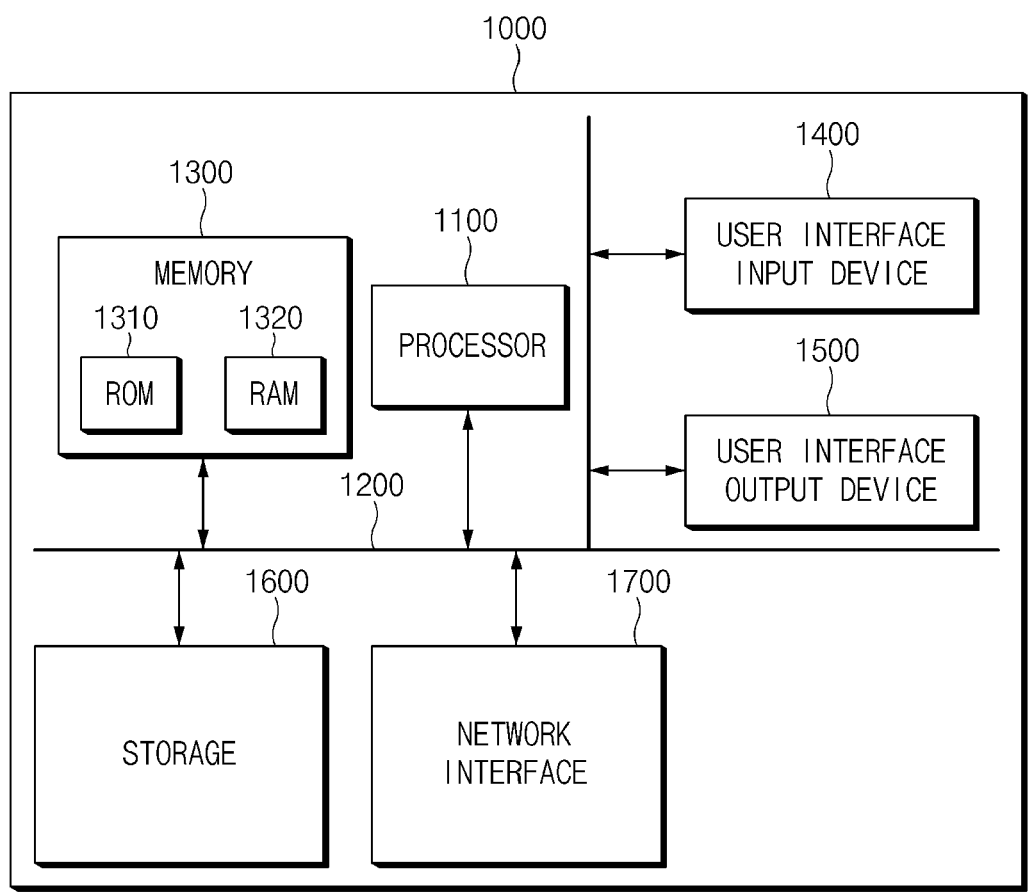
FIG. 13 illustrates a computing system in one form of the present disclosure.

FIG. 13 illustrates a computing system in some forms of the present disclosure.

Referring to FIG. 13, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in some forms of the present disclosure disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may be implemented with separate components in the user terminal.

The present disclosure may recognize an object based on big data and may determine a driving pattern according to the type and attribute of the recognized object, thereby diversifying a vehicle control strategy and increasing autonomous driving stability by increasing the recognition rate of an object.

Besides, a variety of effects directly or indirectly understood through this disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A server comprising:
a processor configured to:
recognize a target object extracted from image information; and
determine a priority for each vehicle behavior scenario based on an accident rate for the each vehicle behavior scenario among a plurality of patterns similar to a mother pattern of the recognized target object;
transmit, to a vehicle, the priority for the each vehicle behavior scenario; and
a storage configured to store at least one of:
information regarding an image similar to the target object;
target object information;
pattern information for each target object;
vehicle behavior scenario information; or
priority information for the each vehicle behavior scenario based on the target object.

2. The server of claim 1, wherein the processor is further configured to:
receive, from the vehicle, image information regarding an unrecognized target object;
after clustering the target object in the image information regarding the unrecognized target object, resize an image of the target object;
identify an image similar to either the resized image or the image information regarding the unrecognized target object; and
recognize the target object based on a type of the identified image and attribute tag information of the identified image.

3. The server of claim 1, wherein the processor is further configured to:
generate a target object identifier (ID) of the recognized target object.

4. The server of claim 1, wherein the processor is further configured to:
when the target object is recognized, generate the mother pattern of the target object including at least one of an attribute of the target object, vehicle information, or environment information.

5. The server of claim 1, wherein the processor is further configured to:
compare the mother pattern of the target object with the pattern information for the each target object; and
extract the plurality of patterns from the pattern information for the each target object, wherein each pattern of the plurality of patterns is similar to the mother pattern of the target object.

6. The server of claim 1, wherein the processor is further configured to:
extract the plurality of patterns for the each target object as patterns of high similarity, wherein the each target object has a value less than an addition of a value of the mother pattern and a margin value.

7. The server of claim 1, wherein the processor is further configured to:
calculate a similarity between the mother pattern and the pattern information for the each target object; and
extract patterns having the calculated similarity greater than a reference value from the pattern information for the each target object.

8. The server of claim 1, wherein the processor is further configured to:
calculate the accident rate for the each vehicle behavior scenario based on an accident occurrence for each vehicle behavior scenario of the plurality of patterns, wherein each pattern is similar to the mother pattern.

9. The server of claim 1, wherein the processor is configured to:
calculate the accident rate for the each vehicle behavior scenario by dividing a first total number of patterns for the each target object, wherein an accident occurs in each pattern when the vehicle operates based on a first vehicle behavior scenario by a second total number of patterns for the each pattern similar to the mother pattern, wherein the vehicle operates in the each pattern based on the first vehicle behavior scenario.

10. The server of claim 1, wherein the processor is configured to:
determine a vehicle behavior scenario priority of the target object corresponding to the accident rate for the each vehicle behavior scenario in a descending order of the accident rate.

11. The server of claim 1, wherein the vehicle behavior scenario includes information regarding acceleration, information regarding deceleration and steering angle for vehicle behavior.

12. The server of claim 1, wherein the processor is further configured to:
when a vehicle control result is received from the vehicle, update at least one of the pattern information for each target object, the vehicle behavior scenario information, or the priority information.

13. An object recognition-based driving pattern managing method, the method comprising:
recognizing, with a processor, a target object extracted from image information;
extracting, with the processor, a plurality of patterns that is similar to a mother pattern of the recognized target object;
determining, with the processor, a priority for each vehicle behavior scenario based on an accident rate for the each vehicle behavior scenario among the plurality of patterns; and
transmitting, with the processor, information regarding the priority for the each vehicle behavior scenario to a vehicle.

14. The method of claim 13, wherein recognizing the target object comprises:
receiving, with the processor, image information regarding an unrecognized target object from the vehicle;
after clustering the target object in the image information, resizing, with the processor, an image of the clustered target object;
identifying, with the processor, an image similar to either the resized image or the image information;
recognizing, with the processor, the target object based on a type of the identified image and attribute tag information of the identified image; and
generating, with the processor, a target object identifier (ID) of the recognized target object.

15. The method of claim 13, wherein extracting the plurality of patterns comprises:
generating, with the processor, the mother pattern including at least one of an attribute of the target object, vehicle information, or environment information;
comparing, with the processor, the mother pattern with the pattern information for each target object; and
extracting, with the processor, the plurality of patterns from the pattern information, wherein each pattern of the plurality of patterns is similar to the mother pattern.

16. The method of claim 13, wherein determining the priority for each vehicle behavior scenario comprises:
- calculating, with the processor, an accident rate for each vehicle behavior scenario based on an accident occurrence for each vehicle behavior scenario of the plurality of patterns, wherein each pattern is similar to the mother pattern; and
- determining, with the processor, a vehicle behavior scenario priority of the target object corresponding to the accident rate for each vehicle behavior scenario in a descending order of the accident rate.

* * * * *